United States Patent [19]

Julicher

[11] Patent Number: 5,632,301
[45] Date of Patent: May 27, 1997

[54] TAMPER RESISTANT CONSTRUCTION FOR HYDRANT

[75] Inventor: Bradley J. Julicher, Williamville, N.Y.

[73] Assignee: McGard, Inc., Orchard Park, N.Y.

[21] Appl. No.: 652,633

[22] Filed: Jun. 7, 1996

[51] Int. Cl.⁶ ........................ F16K 35/06; E03B 9/06
[52] U.S. Cl. .................. 137/296; 81/124.3; 81/125.1; 137/382.5; 137/800; 220/284; 220/725; 220/726; 251/291
[58] Field of Search .................. 137/296, 371, 137/377, 381, 382, 382.5, 800; 220/284, 724, 725, 726, 727; 251/291, 292; 81/124.3, 125, 125.1

[56] References Cited

U.S. PATENT DOCUMENTS

| Re. 27,616 | 4/1973 | Diaz | 137/382.5 |
|---|---|---|---|
| 2,576,631 | 11/1951 | Mueller et al. | 137/13 |
| 2,762,386 | 9/1956 | Fogle | 137/296 |
| 3,070,115 | 12/1962 | Jester | 137/296 |
| 3,450,148 | 6/1969 | Mongelluzzo et al. | 137/296 |
| 3,453,897 | 7/1969 | Adinolfi | 74/89.15 |
| 3,626,961 | 12/1971 | Quinones | 137/296 |
| 3,709,249 | 1/1973 | Diaz | 137/296 |
| 3,840,041 | 10/1974 | McMurray | 137/296 |
| 3,916,939 | 11/1975 | Gillard | 137/296 |
| 3,935,877 | 2/1976 | Franceschi | 137/296 |
| 4,033,372 | 7/1977 | Bowman | 137/296 |
| 4,369,807 | 1/1983 | Camp | 137/296 |
| 4,526,193 | 7/1985 | Drach | 137/296 |
| 4,566,481 | 1/1986 | Leopold, Jr. et al. | 137/296 |
| 4,620,428 | 11/1986 | Kopesky | 70/175 |
| 4,633,896 | 1/1987 | Bainbridge et al. | 137/296 |
| 4,716,922 | 1/1988 | Camp | 137/296 |
| 4,936,336 | 6/1990 | McCauley et al. | 137/296 |
| 5,205,312 | 4/1993 | Jerman et al. | 137/296 |

FOREIGN PATENT DOCUMENTS

| 734267 | 4/1943 | Germany | 137/296 |
|---|---|---|---|

*Primary Examiner*—George L. Walton
*Attorney, Agent, or Firm*—Joseph P. Gastel

[57] ABSTRACT

A tamper resistant construction for a fire hydrant including a hydrant nut actuating body for mounting on a hydrant nut, a shroud rotatably mounted on a first end portion of the hydrant nut actuating body, a cap rotatably mounted on a second end portion of the hydrant nut actuating body, a wrench-receiving portion on the hydrant nut actuating body, a spring mounted within the hydrant nut actuating body and secured to the cap for biasing the cap over the wrench-receiving portion, and a specialized wrench for retracting the cap and engaging the wrench-receiving portion on the hydrant nut actuating body to thereby turn the hydrant nut actuating body and a hydrant nut coupled thereto.

22 Claims, 3 Drawing Sheets

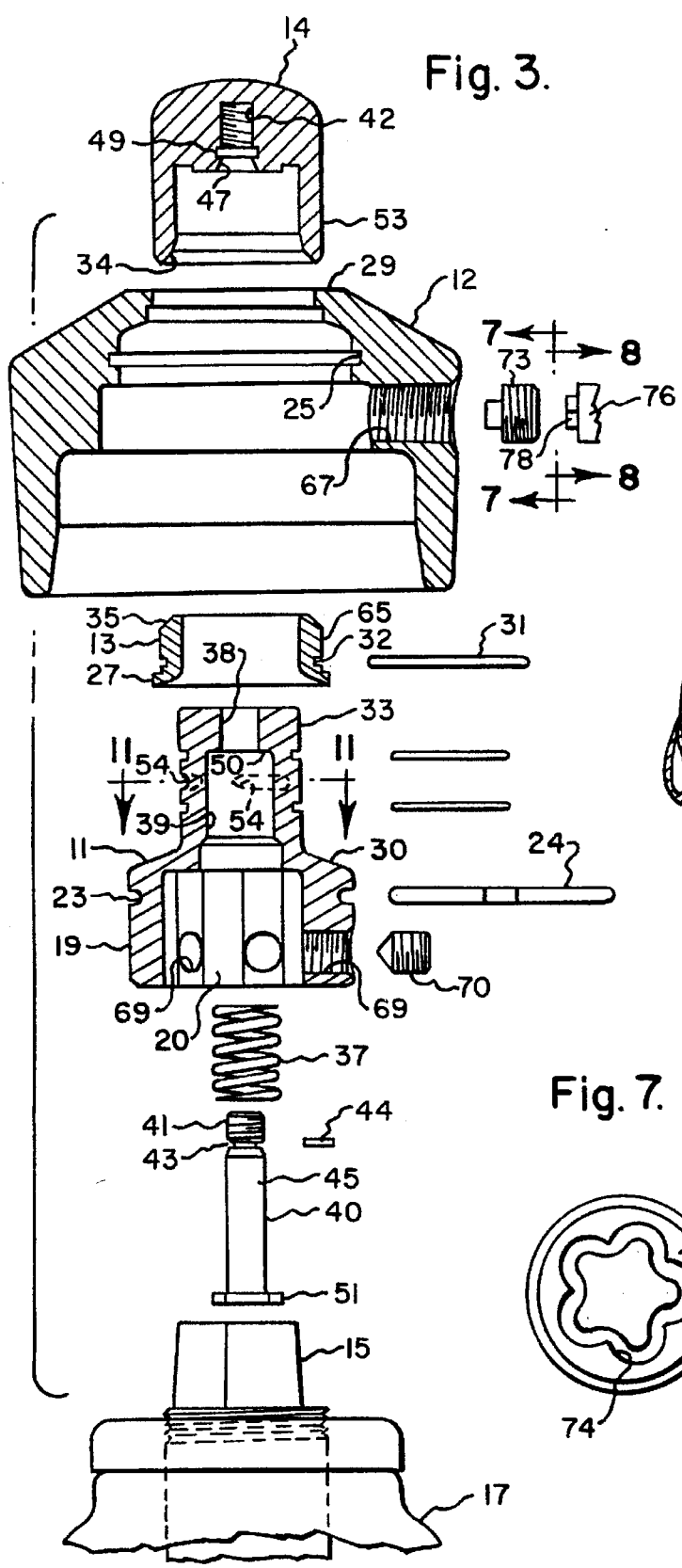
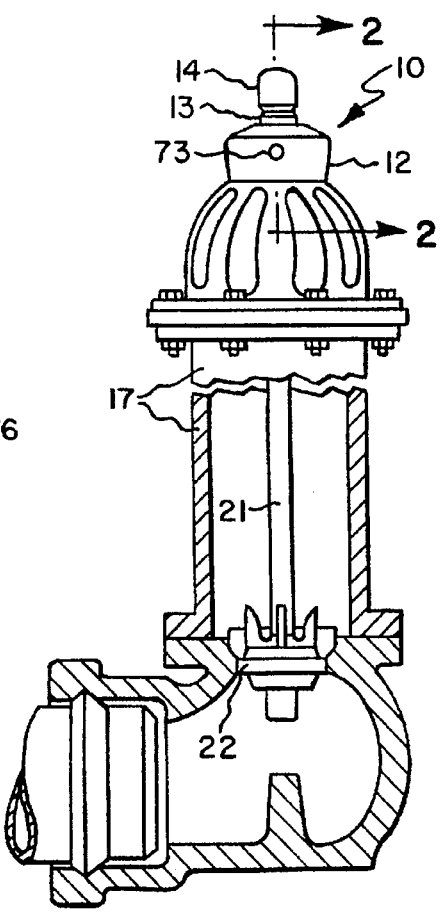
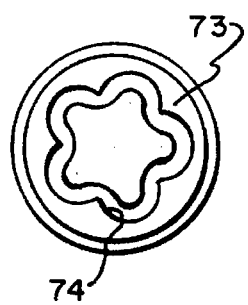
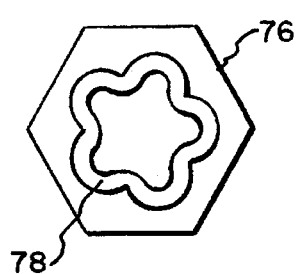

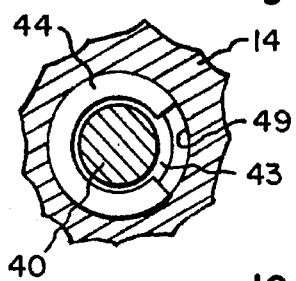
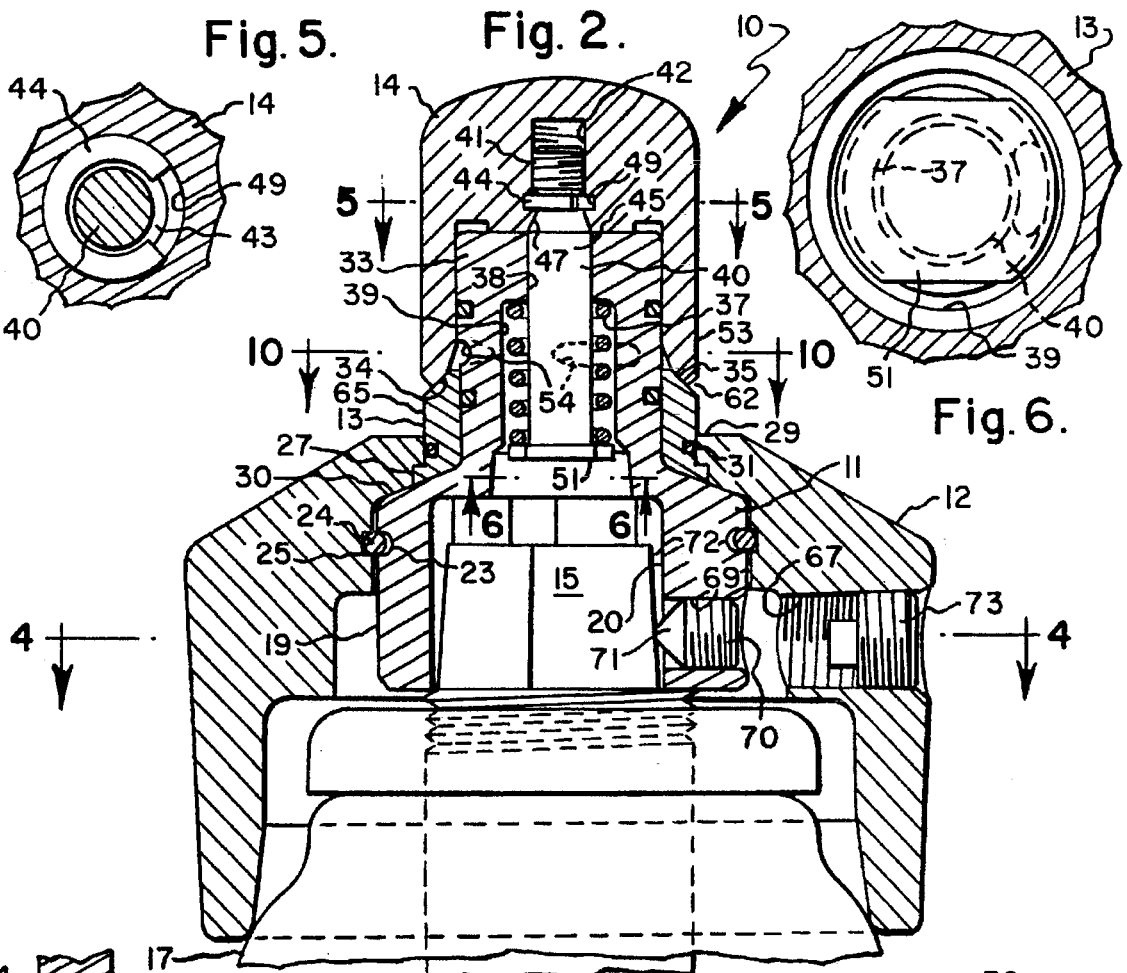
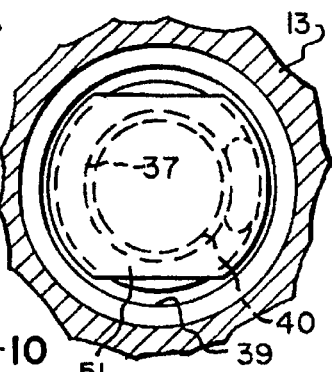
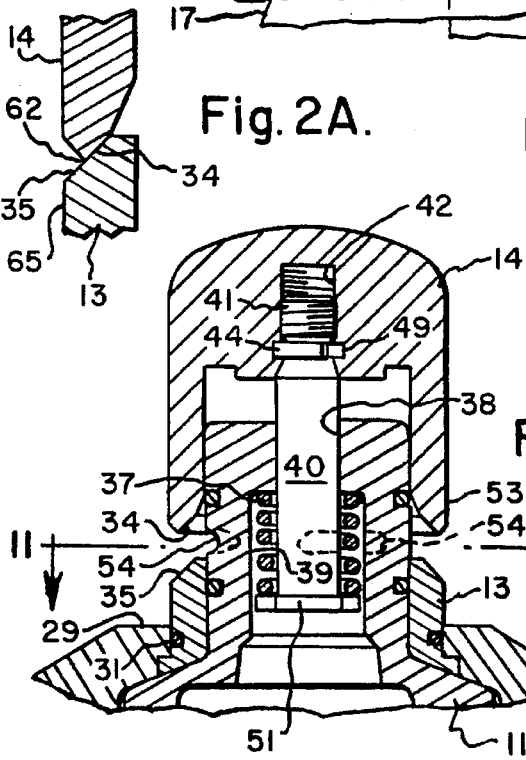
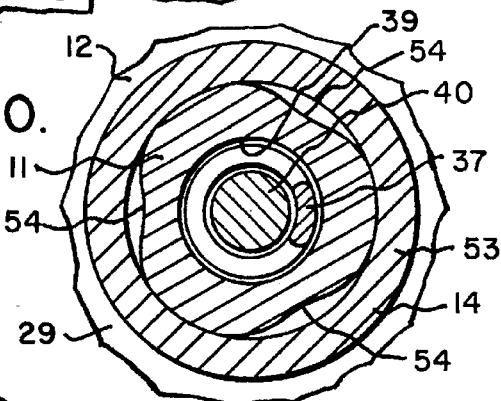
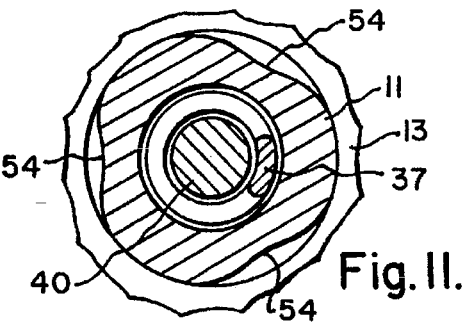

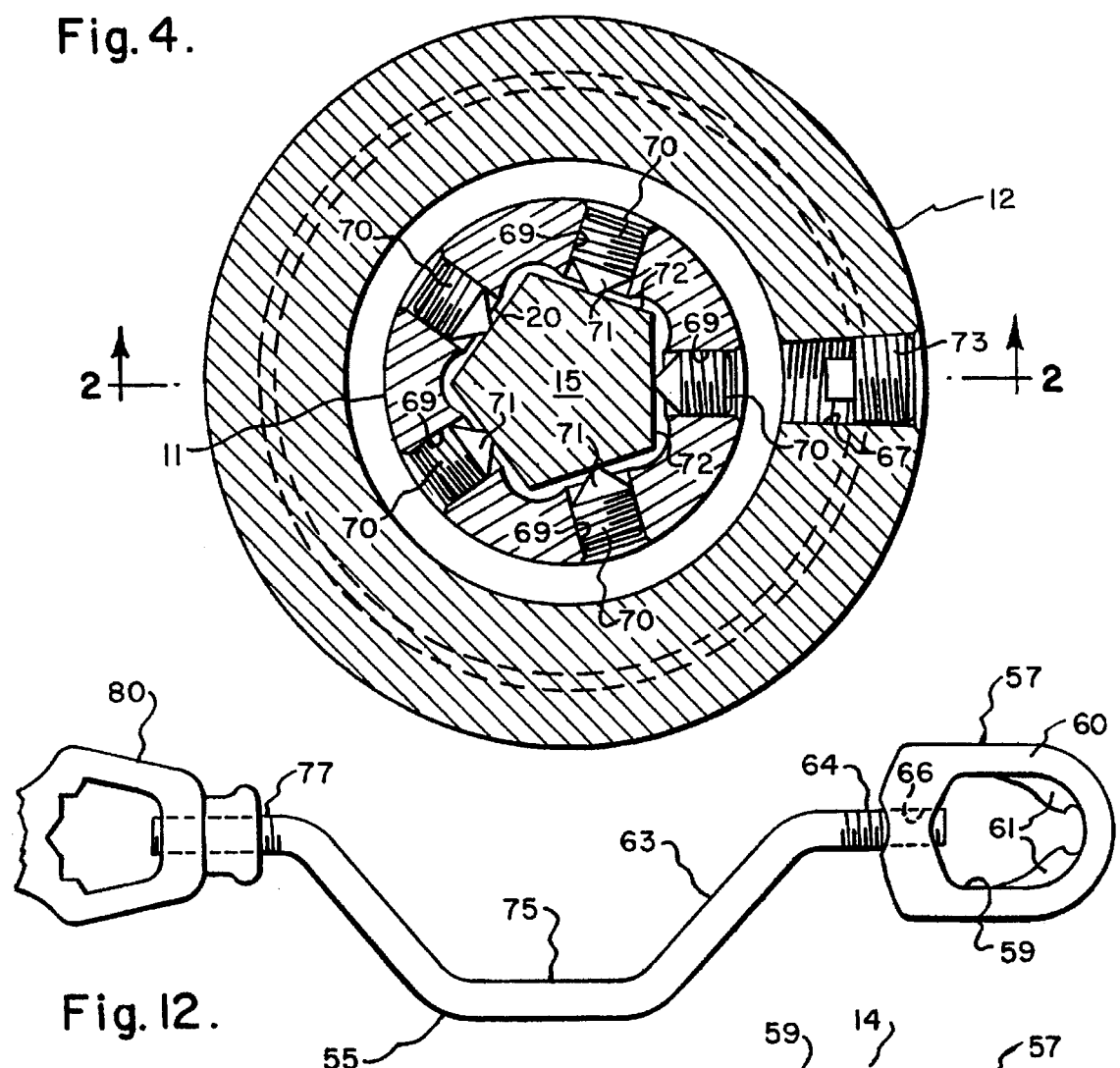
Fig. 4.
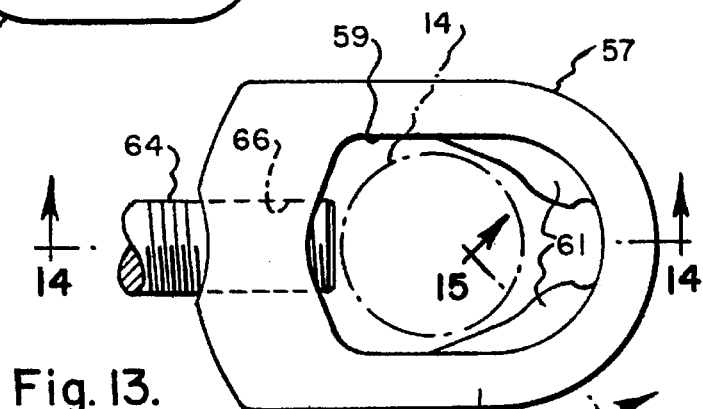
Fig. 12.
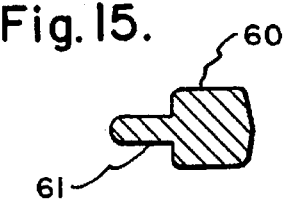
Fig. 15.
Fig. 13.
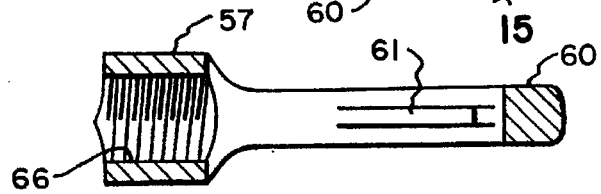
Fig. 14.

5,632,301

1

TAMPER RESISTANT CONSTRUCTION FOR HYDRANT

BACKGROUND OF THE INVENTION

The present invention relates to an improved tamper resistant construction for preventing unauthorized turning of the actuating nut of a fire hydrant and it is an improvement over the construction disclosed in U.S. Pat. No. 4,936,336.

In U.S. Pat. No. 4,936,336 a rotatable shroud and a rotatable cap are mounted on a hydrant nut actuating body which is mounted in nonturning relationship on the hydrant actuating nut. The turning of the cap and shroud will not turn the hydrant nut actuating body, and thus will not turn the hydrant nut. However, a small portion of the hydrant nut actuating body is exposed between the rotatable shroud and rotatable cap to receive a special wrench for turning the hydrant nut actuating body and the hydrant nut coupled thereto. However, in the past this small exposed portion could be accessed by makeshift tools in rare instances to turn the hydrant nut actuating body. It is with an improvement over the foregoing construction that the present invention is concerned.

SUMMARY OF THE INVENTION

It is one object of the present invention to provide an improved tamper resistant construction for the nut of a fire hydrant which obscures access to any part of the tamper resistant construction which can be turned to turn the hydrant nut.

Another object of the present invention is to provide an improved tamper resistant construction for a hydrant which permits turning of the hydrant nut only by use of a specialized wrench which retracts a cap which obscures access to and establishes a turning relationship with the hydrant nut actuating body which is used to turn the hydrant actuating nut. Other objects and attendant advantages of the present invention will readily be perceived hereafter.

The present invention relates to a tamper resistant construction for a fire hydrant comprising a hydrant nut actuating body having first and second end portions, a shroud rotatably mounted on said first end portion of said hydrant nut actuating body, a cap rotatably mounted on said second end portion of said hydrant nut actuating body, a wrench-receiving portion on said hydrant nut actuating body, and a spring biasing said cap over said wrench-receiving portion.

In a more specific aspect, a wear ring is mounted on the hydrant nut actuating body between said shroud and said cap, and there is a lower edge on the cap in engagement with the upper edge on the wear ring. A still further aspect relates to a specialized wrench which bears on the wear ring and wedges the cap away from the wear ring and engages the wrench-receiving portion on the hydrant nut actuating body.

The various aspects of the present invention will be more fully understood when the following portions of the specification are read in conjunction with the accompanying drawings wherein:

BRIEF DESCRIPTION OF THE DRAWINGS

FIG. 1 is a fragmentary side elevational view, partially in cross section of the improved tamper resistant construction mounted on a fire hydrant;

FIG. 2 is a fragmentary cross sectional view taken substantially along line 2—2 of FIG. 1 and line 2—2 of FIG. 4 and showing the various parts of the tamper resistant construction in their normal positions which prevent turning of the hydrant nut;

2

FIG. 2A is an enlarged fragmentary cross sectional view of a portion of FIG. 2 showing the adjacent areas of the cap and the wear ring;

FIG. 3 is an exploded view, partially in cross section, showing various parts of the tamper resistant construction except the actuating wrench therefor;

FIG. 4 is a cross sectional view taken substantially along line 4—4 of FIG. 2 and showing the structure for firmly attaching the tamper resistant construction to the hydrant nut;

FIG. 5 is a cross sectional view taken substantially along line 5—5 of FIG. 2 and showing the bolt-mounted snap ring for locking the cap to the remainder of the tamper resistant construction;

FIG. 6 is a fragmentary cross sectional view taken substantially along line 6—6 of FIG. 2 and showing the position of the head of the bolt relative to the hydrant nut actuating body;

FIG. 7 is a view taken substantially in the direction of arrows 7—7 of FIG. 3 and showing the configuration of the head of the plug which is inserted into the shroud of the tamper resistant structure;

FIG. 8 is a view taken substantially in the direction of arrows 8—8 of FIG. 3 and showing the face of the key which is used to turn the plug of FIG. 7;

FIG. 9 is an enlarged fragmentary cross sectional view similar to the upper portion of FIG. 2 but showing the position to which the cap of the tamper resistant construction is moved by the actuating wrench;

FIG. 10 is a fragmentary cross sectional view taken substantially along line 10—10 of FIG. 2 when the cap is closed and showing the configuration of the portion of the hydrant nut actuating body which receives mating portions of the actuating wrench;

FIG. 11 is a cross sectional view taken substantially along line 11—11 of FIG. 9 and further showing the relevant configuration of the portion of the hydrant nut actuating body when the cap is moved to expose the wrench-receiving portion of the hydrant nut actuating body;

FIG. 12 is a side elevational view of the wrench which is utilized to move the cap of the tamper resistant construction away from its protective covering relationship to the hydrant nut actuating body and for engaging the latter to turn the hydrant nut;

FIG. 13 is an enlarged plan view of the head of the hydrant nut actuating wrench;

FIG. 14 is a cross sectional view taken substantially along line 14—14; and

FIG. 15 is a cross sectional view taken substantially along line 15—15 of FIG. 13.

DESCRIPTION OF THE PREFERRED EMBODIMENTS

The improved tamper resistant construction 10 for a hydrant 17 includes four basic parts, namely, hydrant nut actuating body 11, shroud 12, wear ring 13, and cap 14. The foregoing four parts are assembled with each other in the following described manner and are intended to be mounted on the actuating nut 15 of hydrant 17.

The hydrant nut actuating body 11 includes a lower portion 19 having a cavity 20 therein which receives hydrant actuating nut 15 which is connected to shaft 21 which in turn is connected to hydrant valve 22 (FIG. 1). A groove 23 in hydrant actuating nut body 19 receives snap ring 24 which is also received in groove 25 of shroud 12 to maintain hydrant nut actuating body 11 and shroud 12 in assembled relationship with wear ring 13 therebetween. In this respect the lower peripheral portion 27 of wear ring 13 is captured between rim 29 of shroud 12 and shoulder 30 of hydrant nut actuating body 13. An O-ring seal 31 is held in groove 32 of wear ring 13. The wear ring 13 is rotatable relative to hydrant nut actuating body 11. The above-described connection between shroud 12 and hydrant nut actuating body 11 permits free rotation of shroud 12 on hydrant nut actuating body 11.

Cap 14 is mounted on the upper portion 33 of hydrant nut actuating body in such a manner that its lower edge 34 is biased into engagement with upper beveled or tapered edge 35 of wear ring 13 by a spring 37. More specifically, spring 37 is retained in cavity 39 of hydrant nut actuating body 13 by bolt 40 which extends through bore 38. Bolt 40 has a threaded end 41 which is received in threaded bore 42 of cap 14. A groove 43 (FIG. 5) adjacent threaded end 41 receives snap ring 44 prior to the time that threaded end 41 is threaded into threaded bore 42. The spring 37 is mounted on the stem 45 of bolt 40, and when threaded end 41 is threaded into threaded bore 42, snap ring 44 will be compressed as it is forced through tapered counterbore 47 of cap 14. A point will be reached where snap ring 44 is abreast of groove 49 in cap 14, and it will then snap into groove 49 so that it will bridge groove 43 of bolt 40 and groove 49 of cap 14 to thereby retain cap 14 permanently and freely rotatably assembled on hydrant nut actuating body 11. The wear ring 13 is captured between the cap 14 and shroud 12, and all three may be rotatable as a unit on hydrant nut actuating body 14.

The resulting threading of bolt 40 into cap 14 will cause spring 37 to be compressed. In this respect the upper end of spring 37 bears against shoulder 50 of hydrant nut actuating body 11 and its lower end bears against head 51 of bolt 40. The spring 37 has a high spring rate, and in the present instance it is contemplated that it will have a spring rate of between 50 and 1,200 pounds per inch so that when it is compressed incidental to being assembled between hydrant nut actuating body 11 and cap 14, up to numerous hundreds of pounds of force could be required to be applied between lower edge 34 of cap 14 and beveled edge 35 of wear ring 13. Different spring rates may be selected to provide different levels of security as well as the difficulty of operation, as desired by the ultimate user.

In the foregoing assembly the lower edge portion 53 of cap 14 covers wrench-receiving grooves 54 (FIG. 2) in hydrant nut actuating body 11 thereby rendering such grooves covered and inaccessible without the use of a specialized wrench which is used to force cap 14 upwardly against the bias of spring 37.

The above described assembly of the hydrant nut actuating body 11, shroud 12, wear ring 13 and cap 14 are mounted on the hydrant nut 15 in substantially the same manner as set forth in U.S. Pat. No. 4,936,336 as follows. First of all, the pentagonal cavity 20 of hydrant nut actuating body 11 is oriented to receive hydrant actuating nut 15 and the hydrant nut actuating body 11 is slipped over hydrant nut 15. Thereafter, shroud 12 is rotated so that the bore 67 (FIG. 4) is in alignment with one of the bores 69 in hydrant nut actuating body 11. Thereafter, a set screw 70 is accessed through bore 67 by a suitable tool such as an Allen wrench or screwdriver and its point 71 is driven into the respective side 72 of actuating nut 15. Thereafter, shroud 12 is rotated relative to the hydrant nut actuating body 11 until bore 67 is aligned with another threaded bore 69 and another set screw 70 in a bore 69 is rotated so that its tip 71 bears into an adjacent side 72 of hydrant nut 15. This process is repeated until the remaining three set screws 70 are driven into engagement with their respective sides of hydrant nut 15. After all of the set screws have been securely driven onto hydrant nut 15, a plug 73 (FIGS. 3, 4 and 7) having a curvilinear key-receiving groove 74 therein is threaded into threaded bore 67 by the use of a suitable key 76 having a curvilinear ridge 78 thereon which mates with curvilinear groove 74. Thus, access to set screws 70 cannot be had without first removing plug 73 with the proper key. It is also contemplated that the portion of the tamper resistant construction of the present invention, wherein the cap 14 is spring biased against the wear ring 13, can be mounted in the manner disclosed in concurrently filed copending application Ser. No. 08/651,294, filed on Jun. 7, 1996. In the copending application a modified packing nut with an internal groove therein replaces the existing packing nut of the hydrant, and the lower portion of a hydrant nut actuating body is located within the upper portion of the modified packing nut, and a plurality of circumferentially spaced studs extend outwardly from the hydrant nut actuating body and are received in the internal groove of the modified packing nut to thereby rotatably secure the hydrant nut actuating body to the packing nut.

In accordance with another aspect of the present invention, a specialized wrench 55 is provided for both uncovering wrench-receiving grooves 54 in hydrant nut actuating body, and for thereafter automatically mating with wrench-receiving grooves 54 so as to turn hydrant nut actuating body 11 and hydrant nut 15 which is received in cavity 20 thereof. More specifically, wrench 55 includes a head 57 having an opening 59 therein which receives cap 14 in the sense that the frame 60 of wrench head 57 can slip over cap 14 until lips 61 are abreast of the annular groove 62 (FIG. 2A) between the lower end of cap 14 and the upper beveled edge 35 of wear ring 13. Thereafter, the handle 63 is rotated to thread its threaded end 64 into opening 59 so that it bears against the lower portion 53 of cap 14 and the adjacent upper portion 65 of wear ring 13. Continued rotation of handle 63 will cause lips 61 to bear against beveled edge 35 of wear ring 13 and also bear against the extreme lower portion 53 of cap 14 to thereby pry cap 14 upwardly against the bias of spring 37. At this time the lips 61 of wrench head 57 will also slide upwardly along beveled edge 35 until such time as they are abreast of wrench-receiving grooves 54 at which time the lips 61 will slip into these grooves or at least be abreast of these grooves so that when the wrench head is rotated relative to the grooves 54, lips 61 will enter such grooves. At this time the wrench can be turned to turn hydrant nut actuating body 11 and the hydrant nut 15 which is nonrotatably retained in cavity 20. The relative positions of the cap 14 and wear ring 13 when the wrench head 57 is in turning position, is depicted in FIG. 9. Assuming a spring rate of 1,000 pounds per inch and assuming that the cap 14 has to be moved ¼ of an inch in order to properly position the wrench head 57 for turning the hydrant nut actuating body 11, 250 pounds of force are required for moving cap 14. It is to be especially noted that the surface 35 of wear ring 13 is sufficiently hard so that it will not be marred by the wrench. It is also to be noted that since cap 14 and shroud 12 are freely rotatably mounted on hydrant nut actuating body 11, the turning of these two parts will not in any way result in the turning of the hydrant nut actuating body 11.

As can be seen from FIG. 12, the wrench handle 63 includes a central portion 75 which is offset from the longitudinal axis which extends through threaded portion 64 and threaded portion 77. This handle thus provides leverage for threading threaded end 64 into wrench head threaded bore 66. In other words, the handle 63 functions in the manner of a hand drill so that there is essentially a lever arm between wrench handle portion 75 and the threaded portions 64 and 77. This is required to generate the necessary force for wedging cap 14 away from wear ring 13 in the above-described manner. The threaded end 77 of handle 63 mounts a conventional universal wrench head 80 of a form which fits various types of hydrant nuts. Thus the same wrench 55 can be used for the hydrant both when the tamper resistant structure 10 is mounted thereon and when it is not.

While a preferred embodiment of the present invention has been disclosed, it will be appreciated that the present invention is not limited thereto but may be otherwise embodied within the scope of the following claims.

What is claimed is:

1. A tamper resistant construction for a fire hydrant comprising a hydrant nut actuating body having first and second end portions, a shroud rotatably mounted on said first end portion of said hydrant nut actuating body, a cap rotatably mounted on said second end portion of said hydrant nut actuating body, a wrench-receiving portion on said hydrant nut actuating body, and a spring biasing a portion of said cap along a portion of said hydrant nut actuating body and over said wrench-receiving portion to prevent unauthorized access thereto.

2. A tamper resistant construction as set forth in claim 1 including a wear ring mounted on said hydrant nut actuating body between said shroud and said cap.

3. A tamper resistant construction as set forth in claim 2 including an upper edge on said wear ring, and a lower edge on said cap in engagement with said upper edge.

4. A tamper resistant construction as set forth in claim 3 wherein said upper edge of said wear ring is beveled toward said lower edge of said cap.

5. A tamper resistant construction as set forth in claim 2 wherein said wear ring is rotatably mounted on said hydrant nut actuating body.

6. A tamper resistant construction as set forth in claim 5 including an upper edge on said wear ring, and a lower edge on said cap in engagement with said upper edge.

7. A tamper resistant construction as set forth in claim 6 wherein said upper edge of said wear ring is beveled toward said lower edge of said cap.

8. A tamper resistant construction as set forth in claim 2 wherein said upper edge of said wear ring is beveled toward said lower edge of said cap.

9. A tamper resistant construction as set forth in claim 1 including a first bore in said upper portion of said hydrant nut actuating body, and wherein said spring is located within said first bore, a second bore in communication with said first bore and extending through said upper portion of said hydrant nut actuating body, a bolt extending through said spring and said second bore, a first end on said bolt received in said cap, and a second end on said bolt bearing against said spring.

10. A tamper resistant construction as set forth in claim 9 including a wear ring mounted on said hydrant nut actuating body between said shroud and said cap.

11. A tamper resistant construction as set forth in claim 10 including an upper edge on said wear ring, and a lower edge on said cap in engagement with said upper edge.

12. A tamper resistant construction as set forth in claim 11 wherein said upper edge of said wear ring is beveled toward said lower edge of said cap.

13. A tamper resistant construction as set forth in claim 10 wherein said wear ring is rotatably mounted on said hydrant nut actuating body.

14. A tamper resistant construction as set forth in claim 13 including an upper edge on said wear ring, and a lower edge on said cap in engagement with said upper edge.

15. A tamper resistant construction as set forth in claim 14 wherein said upper edge of said wear ring is beveled toward said lower edge of said cap.

16. A tamper resistant construction as set forth in claim 9 including a snap ring between said bolt and said cap.

17. A tamper resistant construction as set forth in claim 1 including a wear ring mounted on said hydrant nut actuating body between said shroud an said cap, an upper edge on said wear ring which is beveled toward said cap, a wrench, a first portion on said wrench for bearing between said beveled surface and said lower edge of said cap, and a second portion on said wrench for nonrotatably engaging said wrench-receiving portion while said first portion bears between said beveled surface and said lower edge of said cap.

18. A tamper resistant construction as set forth in claim 17 including an upper edge on said wear ring, and a lower edge on said cap in engagement with said upper edge.

19. A tamper resistant construction as set forth in claim 18 wherein said wear ring is rotatably mounted on said hydrant nut actuating body, a first bore in said upper portion of said hydrant nut actuating body, and wherein said spring is located within said first bore, a second bore in communication with said first bore and extending through said upper portion of said hydrant nut actuating body, a bolt extending through said spring and said second bore, a first end on said bolt received in said cap, and a second end on said bolt bearing against said spring.

20. A tamper resistant construction as set forth in claim 1 including a wrench, a wrench head on said wrench, an opening in said wrench head, lips on said wrench head facing said opening for engaging said wrench receiving portion, a wrench handle, and a threaded end on said wrench handle threadable into said wrench head in effective opposition to said lips.

21. A tamper resistant construction as set forth in claim 20 wherein said wrench handle includes a portion which is offset relative to said threaded end.

22. A tamper resistant construction as set forth in claim 21 wherein said wrench handle includes an end opposite said threaded end for mounting a second wrench head.

* * * * *